United States Patent Office 3,406,075
Patented Oct. 15, 1968

3,406,075
METHOD OF TREATING FRUIT
Harold W. Zukerman, Chicago, Ill., assignor to National Dairy Products Corporation, New York, N.Y., a corporation of Delaware
No Drawing. Filed Feb. 23, 1965, Ser. No. 434,621
7 Claims. (Cl. 99—102)

ABSTRACT OF THE DISCLOSURE

Treating cherries to remove sulfur dioxide by aerating in an aqueous solution containing sulfur dioxide under controlled pH conditions.

---

This invention relates generally to the treatment of cherries, and more particularly it relates to a method for removing sulfur dioxide from cherries during treatment thereof.

Cherries which are employed as raw materials in the manufacture of maraschino cherries are conventionally shipped and stored in a preservative aqueous sulfur dioxide brine prior to processing. The sulfur dioxide brine generally contains from about 2000 p.p.m. (parts per million) to 4500 p.p.m. of sulfur dioxide, and the cherries immersed in the brine imbibe the sulfur dioxide and have a substantially equivalent sulfur dioxide content. A calcium compound such as calcium carbonate, calcium hydroxide or calcium chloride, is normally present in the brine in an amount of at least about 0.25 percent to maintain firmness in the cherries.

In the manufacture of maraschino cherries, the sulfur dioxide content of the cherries must be substantially depleted prior to sugaring and packaging of the cherries, generally to a level of not more than about 200 p.p.m. Up to the about 200 p.p.m. of sulfur dioxide, generally about 50 p.p.m., is retained in the cherries as a preservative for the maraschino cherry product.

A known process for the removal of sulfur dioxide from cherries comprises leaching the sulfur dioxide from the cherries with hot water. However, removal of the sulfur dioxide by water leaching is time-consuming and requires an abundant supply of hot water. Leaching the cherries with hot water also leaches substantial amounts of the water soluble reducing sugars from the cherries along with the sulfur dioxide. Further, the natural color and flavor of the cherries is leached out of the cherries by hot water leaching producing a colorless, flavorless, substantially sugarless cherry pulp.

It is a principal object of the present invention to provide a method for treating cherries to remove sulfur dioxide therefrom. Another object is to provide a convenient and economical method of treating cherries immersed in an aqueous sulfur dioxide brine to reduce the sulfur dioxide content thereof. An additional object is to provide a method of treating cherries immersed in a sulfur dioxide brine to reduce the sulfur dioxide content thereof without substantially destroying the natural color of the cherries. A further object is to provide a method of treating cherries immersed in a sulfur dioxide brine to reduce sulfur dioxide content thereof without substantially depleting the reducing sugars in the cherries. Another object is to provide a method of treating cherries immersed in a sulfur dioxide brine to reduce the sulfur dioxide content thereof without destroying the natural flavors of the cherries. Yet another object is to provide a convenient and economical method for the manufacture of maraschino cherries.

Other objects and advantages of the present invention will become apparent from the following detailed description.

Generally, the present invention is directed to a method of treating cherries to remove sulfur dioxide therefrom, which method comprises aerating cherries containing sulfur dioxide while maintaining the pH of the cherries below the maximum bisulfite pH, which is hereinafter defined. More specifically, the present invention includes treating cherries immersed in a sulfur dioxide brine to remove sulfur dioxide therefrom by aerating the brine while maintaining the pH of the brine below the maximum bisulfite pH. The pH of the brine is preferably maintained below about 4.5 and the brine is preferably heated in order to enhance the removal of the sulfur dioxide.

Sulfur dioxide readily dissolves in water to form an aqueous brine. The following equations illustrate the dissociation which occurs when sulfur dioxide is dissolved in water:

(1) $SO_2 + H_2O \quad H_2SO_3$
(2) $H_2SO_3 \quad H^+ + HSO_3^-$
(3) $HSO_3^- \quad H^+ + SO_3^=$ It is known that the dissociation of a sulfur dioxide-water system, and the form of the ions and amount of ions is a function of the pH of the system. At a pH between about 3.5 and 4.5 substantially all of the sulfur dioxide present in the system is in the form of bisulfite ions ($HSO_3^-$) as illustrated by Equation 2. The exact point at which the brine contains substantially 100 percent bisulfite ions which, for the purposes of the present invention, is defined as the "maximum bisulfite pH," is difficult to ascertain. However, it is believed that the maximum bisulfite pH falls somewhere within the pH range of between about 3.5 and about 4.5.

At pH's between 0 and the maximum bisulfite pH, the sulfur dioxide is present in the system in the forms shown in Equations (1) and (2), i.e., non-ionized sulfurous acid, bisulfite ions and free dissolved sulfur dioxide gas. Within this pH range, there are substantially no sulfite ions ($SO_3^=$) present in the system. At a pH between the maximum bisulfite pH and about 10.5, the sulfur dioxide is present in the form of bisulfite ions, sulfite ions in accordance with Equations (2) and (3), and substantially no non-ionized sulfurous acid or dissolved sulfur dioxide gas, are present in the system. At a pH of above about 10.5, substantially all of the sulfur dioxide in the system is present in the form of sulfite ions.

As indicated, at a pH below the maximum bisulfite pH, the distribution of the sulfur dioxide in the system between bisulfite ions, non-ionized sulfurous acid and dissolved sulfur dioxide gas, depends upon the pH of the system. The amount of bisulfite ions in the system is maximum (about 100 percent) at the maximum bisulfite pH and decreases as the pH approaches 0.

It has been discovered that if the pH of the cherries and/or the pH of the brine in which the cherries are immersed, is maintained at a pH at which a significant amount of dissolved sulfur dioxide gas is present in the sulfur dioxide-water brine, that is, at a pH below the maximum bisulfite pH, sulfur dioxide may be efficiently and economically removed from the cherries by aerating the cherries with a suitable gaseous medium to drive off sulfur dioxide gas. It is important that the pH is maintained below the maximum bisulfite pH in order that the sulfur dioxide gas can be driven off. Removal of a portion of the dissolved sulfur dioxide gas causes the equilibrium in Equations (1) and (2) to shift to the left thereby causing bisulfite ions to be converted to sulfurous acid and sulfur dioxide. So long as the pH of the system remains the same, the percentage of sulfur dioxide in the system will remain the same. Thus, it can be seen that continued aeration of the sulfur dioxide containing brine will remove substantially all of the sulfur dioxide from the brine.

The aeration of the brine is continued until the sulfur dioxide content of the cherries and brine is reduced to the desired level. The sulfur dioxide content of the cherries may, if desired, be reduced to substantially 0 p.p.m. by extended aeration. Generally, however, it is desirable to retain a small amount of sulfur dioxide in the cherries as a preservative. When it is desired to utilize sulfur dioxide as a preservative for the cherries, aeration of the cherries is continued until the total sulfur dioxide content of the cherries is below about 200 p.p.m., preferably below about 50 p.p.m.

It has been determined that in order to insure that a portion of the sulfur dioxide in the brine will be in the form of dissolved sulfur dioxide gas, the brine should desirably be maintained at a pH below about 4.2. At pH's above about 4.2, the sulfur dioxide is not removed at a sufficiently rapid rate, and inordinately long aeration is required as compared to that required at somewhat lower pH's. As pointed out above, the exact maximum bisulfite pH, below which the brine contains dissolved sulfur dioxide gas, cannot be precisely determined in all systems. However, experience has shown that at a pH below about 4.2 the brine will contain dissolved sulfur dioxide gas. Preferably, the brine is maintained at a pH of about 3.5 or lower. As the pH of the brine approaches 0, the concentration of dissolved sulfur dioxide gas in the brine increases, and, from a theoretical standpoint, aeration is preferably carried out at a pH as close to zero as is practical. However, at pH's below about 2.0, the cherries may become soft and mushy. Accordingly, a desired pH range is between about 2.0 and about 4.2, preferably between about 3.5 and about 3.8.

If the pH of the brine is above 4.2 prior to aeration, a suitable acidic material may be added to the brine to reduce the pH below 4.2. Due to the small amount of acid required, substantially any food or edible acid may be employed. Suitable examples of acids include hydrochloric acid, phosphoric acid, sulfuric acid, citric acid, lactic acid, adipic acid, fumaric acid and anhydrides thereof. A preferred acid is phosphoric acid since it does not attack stainless steel.

The brine may be aerated with any gaseous medium that is inert with respect to the cherries and/or brine. Generally, it is most economical to employ air, but it is contemplated to employ nitrogen or another gas. The air is preferably filtered through a charcoal filter to remove impurities before being injected into the brine. The air may be injected into the mixture of cherries and brine through one or more aerators disposed beneath the surface of the brine in an aeration vat. The air may be injected into the mixture at any suitable flow rate that is sufficient to drive out the dissolved sulfur dioxide. A flow rate of about 0.01 cubic feet of air per minute per pound of cherries has been found to be satisfactory.

The aeration of the brine is preferably carried out at an elevated temperature. The solubility of sulfur dioxide in water decreases as the temperature of the water is increased, and heating of the brine to an elevated temperature aids in removing sulfur dioxide therefrom. Desirably, the brine is heated to a temperature above ambient temperatures and below the temperature at which the cherries may be impaired, preferably between about 120° F. and about 140° F.

A portion of the sulfur dioxide present in the brine may chemically combine with certain of the aldehydes and reducing sugars present in the cherries, forming bisulfite complexes which do not enter into the equilibrium reactions set forth above. For example, at a pH of about 4.1, about 25 percent of the sulfur dioxide will form complexes with the aldehydes and reducing sugars present in the cherries. It has been found that heating of the brine to an elevated temperature while maintaining the pH around 3.5 or lower causes these aldehyde and sugar bisulfite complexes to dissociate yielding bisulfite ions which then equilibrate in accord with the foregoing chemical equations. Accordingly, the bisulfite ions obtained from the dissociated aldehyde and sugar complexes may be removed from the brine in accordance with the described equilibrium reactions when the brine is heated to an elevated temperature.

The aerated cherries have substantially the same color and flavor as raw cherries and contain substantially all of the reducing sugars present in the raw cherries. The aerated cherries may be further processed in any desired manner. When the cherries are utilized as the raw materials in the manufacture of maraschino cherries, the aerated cherries and brine are pumped into a sugaring vat and a sugar syrup is added thereto until the desired sugar content is reached in accordance with conventional manufacturing procedures. Since no solution is removed from the cherries during the removal of the sulfur dioxide, all of the natural reducing sugars are present in the brine. Accordingly, a lesser amount of sugar syrup is required. An amount of food coloring may be added to the cherries, if desired, along with the sugar syrup in order to provide the cherries with improved color. Since the process of the present invention retains the normal color and flavor of the cherries, lesser amounts of artificial color and flavor are required.

EXAMPLE 10,000 pounds of halved cherries immersed in 10,000 pounds of an aqueous sulfur dioxide brine containing 4,000 p.p.m. sulfur dioxide are introduced into an aeration vat, and the temperature of the brine is adjusted to 135° F. by passing steam through coils immersed in the brine. Air at a flow rate of 127 cu. ft. per minute is introduced into the brine through a plurality of injection nozzles immersed in the brine and a sufficient amount of phosphoric acid is added to the aeration vat to reduce the pH of the brine to about 3.5. The aeration of the brine and cherries is continued for 12 hours at an air flow rate of 127 cu. ft. per minute, after which the air flow rate is adjusted to 80 cu. ft. per minute for an additional 4 hours and then turned off.

The aerated cherries have a total sulfur dioxide content of about 50 p.p.m. and have substantially the same flavor and the same color as raw cherries. Further, the cherries contain all their natural sugar content.

The aerated cherries are then transferred to a sugaring vat and are sugared and packaged in accordance with conventional procedures for the manufacture of maraschino cherries. A high quality maraschino cherry product is obtained that is the equivalent of maraschino cherries prepared by procedures utilized heretofore.

It can be seen that a process has been provided whereby sulfur dioxide may be conveniently and economically removed from cherries. The process of the present invention efficiently removes sulfur dioxide from cherries without destroying the natural flavor and color of the cherries, and without removing the natural sugar content of the cherries. Further, the process is ideally suited for large scale continuous manufacture of maraschino cherries.

Although certain features of the invention have been described with particularity for purposes of illustration, it is contemplated that alternative embodiments within the scope of the art may be employed. In this connection, reference has ben made throughout the specification to cherries immersed in a sulfur dioxide brine. It is contemplated that the cherries may be also processed within the scope of the present invention after being removed from the brine.

Various of the features of the invention are set forth in the following claims.

What is claimed is:
1. A method for treating cherries to remove sulfur dioxide therefrom comprising, aerating cherries immersed in an aqueous solution containing sulfur dioxide while maintaining the pH of the cherries below the pH at which sulfite ions are present in the solution, for a period of time sufficient to susbtantially reduce the sulfur dioxide content of said cherries.

2. A method for treating cherries to remove sulfur dioxide therefrom comprising, aerating cherries immersed in an aqueous sulfur dioxide brine while maintaining the pH of the brine below that at which substantially all of the sulfur dioxide is present in the form of $HSO_3^-$ ions, for a period of time sufficient to substantially reduce the sulfur dioxide content of said cherries.

3. A method for treating cherries to remove sulfur dioxide therefrom comprising, heating cherries immersed in an aqueous solution containing sulfur dioxide to a temperature above ambient temperature, adjusting the pH of the cherries to below about 4.5, and aerating the cherries with a gaseous medium, for a period of time sufficient to substantially reduce the sulfur dioxide content of said cherries.

4. A method for treating cherries to remove sulfur dioxide therefrom comprising, heating cherries immersed in an aqueous sulfur dioxide brine to a temperature above about 120° F., adjusting the pH of the brine to below about 4.2, and aerating the cherries with a gaseous medium for a period of time sufficient to reduce the sulfur dioxide content to below about 200 p.p.m.

5. A method for treating cherries to remove sulfur dioxide therefrom comprising, heating cherries immersed in an aqueous solution containing sulfur dioxide to a temperature between about 120° F. and about 140° F., adjusting the pH of the cherries to between about 2.0 and about 4.2, aerating the cherries with a gaseous medium, and continuing said aerating until the sulfur dioxide content of the cherries is less than about 200 p.p.m.

6. A method for treating cherries to remove sulfur dioxide therefrom comprising, heating cherries immersed in an aqueous sulfur dioxide brine to a temperature between about 120° F. and about 140° F., adjusting the pH of the brine to between about 3.5 and about 3.8, aerating the cherries with a gaseous medium, and continuing said aerating until the sulfur dioxide content of the cherries is less than 200 p.p.m.

7. A method for the manufacture of maraschino cherries comprising, heating cherries immersed in an aqueous sulfur dioxide brine to a temperature between about 120° F. and about 140° F., adjusting the pH of the brine to between about 3.5 and about 3.8, aerating the cherries with a gaseous medium, continuing said aerating until the sulfur dioxide content of the cherries is less than about 50 p.p.m., and adding a sugar syrup to the cherries.

References Cited

UNITED STATES PATENTS

| | | | |
|---|---|---|---|
| 3,101,271 | 8/1963 | Croall | 99—154 |
| 3,307,954 | 4/1967 | Blakemore | 99—102 |

RAYMOND N. JONES, *Primary Examiner.*

J. M. HUNTER, *Assistant Examiner.*